United States Patent
Angelides et al.

(10) Patent No.: US 8,613,896 B2
(45) Date of Patent: Dec. 24, 2013

(54) PROCESS FOR REMOVING NITROUS OXIDE FROM A GAS STREAM

(75) Inventors: Christos Odyssea Angelides, Houston, TX (US); Bradley Douglas Morello, Houston, TX (US)

(73) Assignee: Shell Oil Company, Houston, TX (US)

( * ) Notice: Subject to any disclaimer, the term of this patent is extended or adjusted under 35 U.S.C. 154(b) by 0 days.

(21) Appl. No.: 13/698,367

(22) PCT Filed: May 17, 2011

(86) PCT No.: PCT/US2011/036790
§ 371 (c)(1),
(2), (4) Date: Dec. 13, 2012

(87) PCT Pub. No.: WO2011/146469
PCT Pub. Date: Nov. 24, 2011

(65) Prior Publication Data
US 2013/0156672 A1   Jun. 20, 2013

Related U.S. Application Data

(60) Provisional application No. 61/346,069, filed on May 19, 2010.

(51) Int. Cl.
*B01D 53/56* (2006.01)
(52) U.S. Cl.
USPC ............ 423/239.1; 423/239.2; 422/207
(58) Field of Classification Search
USPC ............... 423/239.1, 239.2; 422/207
See application file for complete search history.

(56) References Cited

U.S. PATENT DOCUMENTS

| | | | |
|---|---|---|---|
| 6,143,262 A | 11/2000 | Murakami et al. | 423/239.1 |
| 7,294,321 B2 | 11/2007 | Abrams | 423/210 |
| 7,300,640 B2 * | 11/2007 | Ohtsuka et al. | 423/210 |
| 7,459,135 B2 | 12/2008 | Pieterse et al. | 423/239.1 |
| 2004/0110627 A1 | 6/2004 | Schwefer et al. | 502/60 |
| 2005/0281724 A1 * | 12/2005 | Hotta et al. | 423/239.1 |
| 2007/0292334 A1 | 12/2007 | Hotta | 423/402 |
| 2008/0044334 A1 | 2/2008 | Pieterse et al. | 423/239.2 |
| 2011/0117000 A1 * | 5/2011 | Nakatani et al. | 423/239.1 |
| 2012/0014855 A1 * | 1/2012 | Beran et al. | 423/239.1 |
| 2012/0063982 A1 * | 3/2012 | Wenning et al. | 423/239.1 |

FOREIGN PATENT DOCUMENTS

JP    55-31463 A  *  3/1980  ............. B01D 53/36

* cited by examiner

*Primary Examiner* — Timothy Vanoy

(57) ABSTRACT

A process is disclosed for the removal of nitrous oxide from a gas stream having a contaminating concentration of nitrous oxide to provide a gas stream with a significantly reduced concentration of nitrous oxide. The process includes passing the feed gas stream through a first heat transfer zone that is in heat exchange relationship with a product stream whereby heat is transferred from the product stream to the feed gas stream to thereby provide a heated gas stream; passing said heated gas stream to a reaction zone containing a $N_2O$ decomposition catalyst and optionally a combination of other catalyst that provides for the decomposition of nitrous oxide or other contaminants and yielding therefrom a product stream having a reduced concentration of nitrous oxide; and passing the product stream to the first heat transfer zone to provide a cooled product stream.

17 Claims, 1 Drawing Sheet

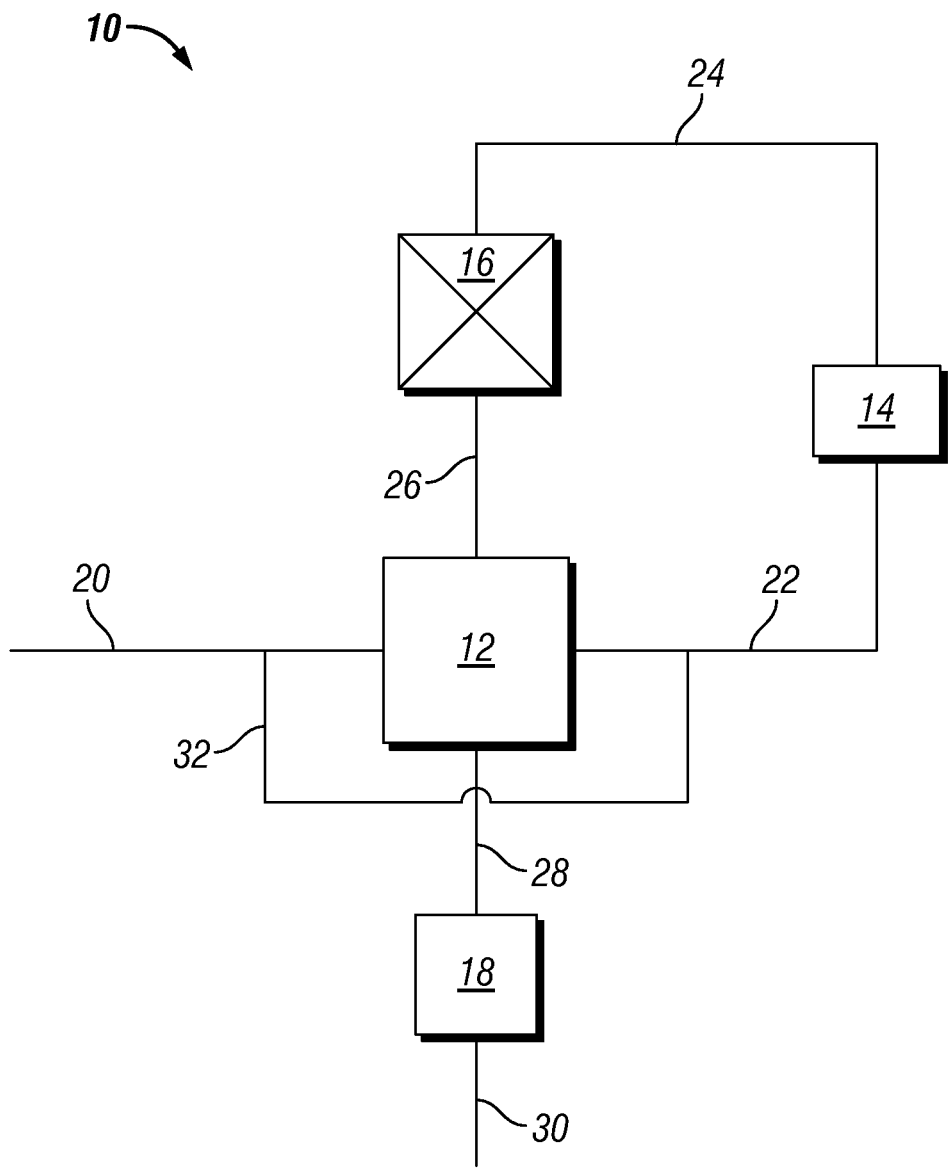

PROCESS FOR REMOVING NITROUS OXIDE FROM A GAS STREAM

PRIORITY CLAIM

The present application claims priority from PCT/US2011/036790, filed 17 May 2011, which claims priority from U.S. provisional application 61/346,069, filed 19 May 2010, which is incorporated herein by reference.

FIELD OF INVENTION

This invention relates to a process for the removal of nitrous oxide ($N_2O$) that is contained at a contaminating concentration in a gas stream.

BACKGROUND

Nitrous oxide ($N_2O$), commonly known as laughing gas, can be a product of the combustion of carbon-containing materials, such as hydrocarbons, and nitrogen bearing compounds, such as ammonia ($NH_3$). Other combustion products include the nitrogen oxides of NO and $NO_2$, both together may be referred to as $NO_x$. Nitrous oxide is considered to be a greater contributor to the greenhouse effect and global warming than certain other greenhouse gases such as carbon dioxide ($CO_2$), and it would be desirable to have a process that is able to economically remove contaminating concentrations of nitrous oxide contained in combustion gases that are released into the atmosphere.

The prior art generally has been focused more on the reduction of nitrogen oxides that are contained in combustion gases rather than on the removal of nitrous oxide. One process used for the removal of $NO_x$ from gas streams is the selective catalytic reduction (SCR) process. One version of this process is disclosed in U.S. Pat. No. 7,294,321. In this selective catalytic reduction process, a combustion gas that contains a concentration of $NO_x$ and ammonia ($NH_3$), which is typically added to the combustion gas as a reactant, is contacted with a catalyst that promotes the reduction reaction in which the $NO_x$ reacts with ammonia and oxygen to yield nitrogen and water.

Disclosed in U.S. Pat. No. 7,459,135 is a catalyst used for the catalytic reduction of $NO_x$. This catalyst comprises a palladium-containing zeolite, wherein the zeolite also comprises scandium or yttrium or a lanthanide or combinations thereof. The teachings of U.S. Pat. No. 7,459,135 are not concerned, however, with the catalytic decomposition of nitrous oxide. One process that does, on the other hand, involve the catalytic decomposition of nitrous oxide contained in a gas is the process disclosed in U.S. Pat. No. 6,143,262. In this process, a gas that contains nitrous oxide is contacted with a catalyst that comprises mainly tin oxide, but it further may include cobalt as a co-catalyst.

Another process for the catalytic decomposition of nitrous oxide is disclosed in US 2008/044334. This publication teaches a catalyst that is used for the catalytic decomposition of nitrous oxide ($N_2O$) to yield nitrogen ($N_2$) and oxygen ($O_2$). The broadly disclosed catalyst of US 2008/044334 comprises a zeolite that has been loaded with a first noble metal and a second transition metal. The first metal is selected from the group consisting of ruthenium (Ru), rhodium (Rh), osmium (Os), and iridium (Ir), and the second metal is selected from the group consisting of iron (Fe), cobalt (Co), and nickel (Ni).

Due to nitrous oxide being a greenhouse gas having a global warming potential that is significantly greater than certain other greenhouse gases, it is desirable to have a process for the removal of nitrous oxide from gas streams that have high concentrations of nitrous oxide and are released into the atmosphere. It is further desirable for such a process to achieve the removal of nitrous oxide in a cost-effective, thermally efficient manner.

SUMMARY OF THE INVENTION

Thus, provided is a process for the removal of nitrous oxide ($N_2O$) from a gas stream containing a contaminating concentration of nitrous oxide, wherein said process comprises passing the feed gas stream through a first heat transfer zone that is in heat exchange relationship with a product stream whereby heat is transferred from the product stream to the feed gas stream to thereby provide a heated gas stream; passing said heated gas stream to a reaction zone containing a $N_2O$ decomposition catalyst that provides for the decomposition of nitrous oxide and yielding therefrom a product stream having a reduced concentration of nitrous oxide; and passing the product stream to the first heat transfer zone to provide a cooled product stream.

BRIEF DESCRIPTION OF THE DRAWING

FIG. 1 is a schematic representation of the process flow and system arrangement of the inventive process for the removal of nitrous oxide from a gas stream that contains a contaminating concentration of nitrous oxide.

DETAILED DESCRIPTION

The inventive process is a highly energy efficient method of removing nitrous oxide from a gas stream that has a contaminating or high concentration of nitrous oxide. Nitrous oxide is a greenhouse gas that has an extremely high global warming potential and contributes to the depletion of the ozone layer of the earth's atmosphere. The inventive process provides for a low required energy input for a given amount of greenhouse gas, i.e., nitrous oxide, that is removed from a gas stream that contains the nitrous oxide, and the process provides for a high percentage of total greenhouse gas removal including the removal of both nitrous oxide and carbon dioxide.

Nitrous oxide can be generated during the combustion of various types of carbonaceous materials and nitrogen bearing compounds by various combustion means such as incinerators, furnaces, boilers, fired heaters, combustion engines and other combustion devices. The carbonaceous and nitrogen bearing materials that may be combusted can include, for example, wood and other cellulosic materials, coal, fuel oil and other petroleum or mineral derived fuels, fuel gas and other gases, and other carbonaceous materials, and nitrogen bearing materials, such as, ammonia and amines. It is contemplated that the more common combustion material of the inventive process will be ammonia, which may be generated from such sources as either in the production, or the use, or the destruction of nitric acid, adipic acid, glyoxal, and glyoxylic acid. Typically, ammonia is burned in a burner that provides for the mixing of air with the gas to give a combustion mixture that, upon its combustion, yields combustion gases. These combustion gases often contain undesirable combustion products such as carbon monoxide, nitrogen oxide, and nitrous oxide.

The combustion of the carbonaceous material provides for a gas stream that can comprise a contaminating concentration of nitrous oxide. The gas stream that is to be treated in the inventive process for the removal of nitrous oxide will typically have a contaminating concentration of nitrous oxide that, generally, is in the range of from about 100 ppmv to about 600,000 ppmv (60 vol. %). More typically, however, the nitrous oxide concentration in the gas stream will be in the range of from 100 ppmv to 10,000 ppmv (1 vol. %), and, most typically, it is in the range of from 100 ppmv to 5,000 ppmv.

Other components of the combustion gas stream can include nitrogen, which source may be contained in nitrogen bearing compounds such as ammonia and nitric acid and to some extent the air used in the combustion of the carbonaceous material, carbon dioxide and water vapor. The amount of carbon dioxide in the combustion gas stream can typically be in the range of from about 5 vol. % to about 20 vol. %, and the amount of water vapor in the combustion stream can typically be in the range of from about 5 vol. % to 20 vol. %. The molecular nitrogen in the combustion gas stream can be in the range of from 50 vol. % to 80 vol. %. If excess amounts of oxygen are used in the combustion of the carbonaceous material, then molecular oxygen can be present in the combustion gas stream, as well. Normally, it is not desirable to use an excess amount of oxygen when burning carbonaceous materials, but when excess oxygen is used in the combustion, typically, oxygen can be present in the combustion gas stream at a concentration in the range of upwardly to about 4 vol. %, or higher, such as in the range of from 0.1 vol. % to 3.5 vol. %.

Other components of the combustion gas stream may include $NO_x$, CO, and $SO_x$. The $NO_x$ can be present in the combustion gas stream at a concentration in the range of from about 1 ppmv to about 10,000 ppmv (1 vol. %). The carbon monoxide may be present at a concentration in the range of from 1 ppmv to 2,000 ppmv or more. The process may further comprise catalyst useful for the reduction of $NO_x$, CO, VOC, dioxin and other undesirable components in the combustion gas stream.

The inventive process provides for a high heat recovery by the use one or more heat transfer zones. The process may be operated with one or more reaction zones in parallel or series if desired. The process and system also provide for a high nitrous oxide destruction removal efficiency along with the high heat recovery efficiency.

Each of the reaction zones of the process system is defined by structure, and contained within each of such reaction zones is a $N_2O$ decomposition catalyst. The $N_2O$ decomposition catalyst provides for the catalytic decomposition or conversion of nitrous oxide to yield nitrogen and oxygen. Any suitable catalyst that is capable of being used under the conditions of the process and which catalyzes the nitrous oxide decomposition reaction may be used in the reaction zones of the process system.

Catalysts that are particularly useful in the inventive process include those disclosed in US Patent Publication No. 2008/0044334, which publication is hereby incorporated herein by reference. Such suitable catalysts include those as are described in detail in US 2008/0044334 and that, generally, comprise a zeolite loaded with a noble metal selected from the group consisting of ruthenium, rhodium, silver, rhenium, osmium, iridium, platinum and gold, and loaded with a transition metal selected from the group consisting of vanadium, chromium, manganese, iron, cobalt, nickel and copper.

Each of the heat transfer zones of the process system is defined by structure. The heat transfer zones may comprise any type of heat exchanger known to one of ordinary skill in the art. The first heat transfer zone is preferably designed so that the feed gas stream and the product stream do not come into direct contact. The first heat transfer zone may comprise shell and tube, plate type exchangers, or any other type of heat transfer system. The second heat transfer zone may comprise a heat exchanger or an apparatus for electrical or gas-fired or steam heating or a combination thereof. Further the second heat transfer zone may be comprised of multiple heat transfer zones that use either the same or different methods of providing heat to the heated gas stream. The third heat transfer zone is preferably an economizer or waste heat boiler or heat transfer fluid exchanger.

As already noted, the inventive process provides for the removal of nitrous oxide from a gas stream that contains a contaminating concentration of nitrous oxide. Typically, the gas stream of the process is a combustion flue gas stream that includes combustion gases and further includes a concentration of nitrous oxide, and it also may further include a concentration of $NO_x$ compounds. It is not, however, the particular objective of the inventive process to remove the $NO_x$ compounds from the gas stream even though their removal may result.

In the typical selective catalytic reduction process used for the removal of $NO_x$ from combustion flue gas streams the presence of a reactant or reductant such as anhydrous ammonia, aqueous ammonia or urea is required along with the contacting of the gas stream with a reduction catalyst in order to convert the $NO_x$. In the inventive process, on the other hand, no reductant need be present in the nitrous oxide containing gas stream that is contacted with the $N_2O$ decomposition catalyst whereby nitrous oxide decomposition occurs. It is even preferred for the gas stream to have a substantial absence of a concentration of ammonia or urea, or both; and, thus, the gas stream of the inventive process should have a concentration of ammonia or urea, or both, or less than about 10,000 ppmv, preferably, less than 1,000 ppmv, and most preferably, less than 10 ppmv.

It is also a desirable aspect of the inventive process for the gas stream to have a low concentration of hydrocarbon compounds. It is, thus, desirable for the hydrocarbon concentration of the gas stream of the inventive process to contain less than 200 ppmv, preferably, less than 50 ppmv, and more preferably, less than 20 ppmv of the total gas stream. The hydrocarbons will generally be those that are normally gaseous at standard pressure and temperature conditions and can include methane, ethane, propane and butane.

In the inventive process, a gas stream that has a contaminating concentration of nitrous oxide is passed and introduced into a first heat transfer zone. The feed gas stream is introduced into the first heat transfer zone wherein thermal or heat energy is exchanged between the product stream and the feed gas stream. During the startup of the process, the heat may be provided by another stream that is passed through the first heat transfer zone. Alternatively, the heat required to startup the system may be provided by any heating means known to one of ordinary skill in the art including electrical heating, gas-fired heating or steam heating.

Typically, the temperature of the gas stream being introduced into the heat transfer zone is in the range of from about 10° C. to about 400° C. The heated gas stream yielded from the first heat transfer zone is passed to a second heat transfer zone. The gas stream is heated in the first heat transfer zone by heat transfer with the product stream. The product stream is hotter than the feed stream due to the heating steps and to the exothermic nature of the $N_2O$ decomposition reaction. The second heat transfer zone employs any heating method known to one of ordinary skill in the art to provide any additional heat needed to heat the stream to suitable $N_2O$ decomposition reaction conditions. The heat may be provided by a gas-fired burner, electrical heating, steam, catalytic combustion, or heat exchange with another stream.

In one embodiment, the N2O concentration is sufficiently high that the process can be operated without heat input in a second heat transfer zone.

The heated gas stream is then introduced into a reaction zone. Contained within the reaction zone is a N₂O decomposition catalyst. This N₂O decomposition catalyst has a composition as is described elsewhere herein. The heated gas stream has a temperature that allows for the nitrous oxide decomposition reaction to occur when it is contacted with the N₂O decomposition catalyst of the reaction zone. The temperature of the heated gas stream, thus, should generally be in the range of from 400° C. to 700° C.

Within the reaction zone, the reaction conditions are such as to suitably provide for the decomposition of at least a portion of the nitrous oxide contained in the heated gas stream to nitrogen and oxygen, and, then, a gas stream having a reduced concentration of nitrous oxide is yielded from the reaction zone. Typically, in this step, due to the exothermic nature of the nitrous oxide decomposition reaction, the gas stream having a reduced concentration of nitrous oxide will have somewhat of an elevated temperature above that of the heated gas stream being introduced into the reaction zone. The exotherm, which is the temperature difference between the temperature of the heated gas stream that passes from the heat transfer zone and introduced into the reaction zone and the temperature of the gas stream having a reduced concentration of nitrous oxide yielded from the reaction zone, may be in the range of from a minimal temperature increase to an increase of 200° C. More typically, however, the exotherm is in the range of from 5° C. to 200° C. and, most typically, it is in the range of from 10° C. to 45° C.

The gas stream having the reduced concentration of nitrous oxide then passes from the reaction zone to the first heat transfer zone.

The gas stream having the reduced concentration of nitrous oxide that is introduced into the first heat transfer zone may have a temperature approximating its temperature when yielded from the reaction zone, or, optionally, its temperature may be further increased by introducing additional heat energy into it prior to passing the gas stream having the reduced concentration of nitrous oxide to the first heat transfer zone. The temperature of the gas stream having the reduced concentration of nitrous oxide that is introduced into the first heat transfer zone will, thus, have a temperature in the range of from about 400° C. to about 700° C. More typically, the temperature can be in the range of from 450° C. to 550° C.

The gas stream having the reduced concentration of nitrous oxide then passes from the first heat transfer zone to a third heat transfer zone. A cooled gas stream is then yielded from the third heat transfer zone. The cooled gas stream passing from the third heat transfer zone will have a temperature approaching that of the gas stream that is introduced into the first heat transfer zone of the process system.

The cooled gas stream may then pass from the third heat transfer zone and into a flue stack or downstream for further processing. The concentration of nitrous oxide is significantly lower than the contaminating concentration of nitrous oxide of the gas stream initially being passed to the heat transfer zone of the process system.

A measure of the amount of nitrous oxide destroyed by the inventive process may be reflected by the overall nitrous oxide destruction removal efficiency percentage of the inventive process. This value is calculated by the difference in the nitrous oxide contained in the gas stream having a contaminating concentration of nitrous oxide that is passed to the process system and the concentration of nitrous oxide contained in the cooled gas stream with the difference being divided by the contaminating concentration of nitrous oxide in the gas stream and the ratio being multiplied by 100. The nitrous oxide destruction removal efficiency ($D_{eff}$) across the process system may then be represented by the formula, $(C_i-C_o)/C_i \times 100$, where $C_i$ is the concentration of nitrous oxide of the gas stream having a contaminating concentration of nitrous oxide, and $C_o$ is the concentration of nitrous oxide of the cooled gas stream.

The nitrous oxide destruction removal efficiency across the process system is significant and can be greater than 75%. It is preferred for the nitrous oxide destruction removal efficiency to be greater than 85%, and more preferably, it is greater than 95%. In the most preferred embodiment of the inventive process, the nitrous oxide destruction removal efficiency can be greater than 97.5% and even greater than 99.9%. It is desirable for the concentration of the nitrous oxide in the cooled gas stream to be less than 100 ppmv, and, preferably, it is less than 75 ppmv. More preferably, the concentration of nitrous oxide in the cooled gas stream is less than 50 ppmv.

Reference is now made to FIG. 1, which presents a schematic representation of the process system 10 and the process streams of the inventive process for the removal of nitrous oxide from a gas stream having a contaminating concentration of nitrous oxide.

Process system 10 includes a first heat transfer zone 12. It is understood that the heat transfer zone 12 may include one or more or a plurality of units with each such unit defining a separate heat transfer zone.

A gas stream having a contaminating concentration of nitrous oxide passes by way of conduit 20 and is introduced into the heat transfer zone 12. In the initial startup of process system 10, the temperature of the gas stream in conduit 20 may be raised by contact with a heated startup stream or by any other heating method known to one of ordinary skill in the art.

The first heat transfer zone 12 is operatively connected and is in fluid flow communication with second heat transfer zone 14 by conduit 22. The second heat transfer zone is operatively connected and is in fluid flow communication with reaction zone 16 by conduit 24.

It is understood that the reaction zone 16 may include one or more or a plurality of reactors each defining a separate N₂O decomposition reaction zone comprising a N₂O decomposition catalyst.

As the gas stream passes through heat transfer zones 12 and 14 thermal or heat energy is transferred to the gas stream, first from the product stream (in heat transfer zone 12) and then from another heating method (in heat transfer zone 14). A heated gas stream is yielded and passes from the heat transfer zone 14 by way of conduit 24 and is introduced into reaction zone 16.

Within reaction zone 16, the gas stream is contacted with N₂O decomposition catalyst under N₂O decomposition reaction conditions that are suitable for the promotion of the decomposition of at least a portion of the nitrous oxide contained in the gas stream to nitrogen and oxygen. The N₂O decomposition reactor 16 is operatively connected and is in fluid flow communication with the first heat transfer zone 12.

A gas stream having a reduced concentration of nitrous oxide is yielded from reaction zone 16 and passes by way of conduit 26 to be introduced into the first heat transfer zone 12. The gas stream having the reduced concentration of nitrous oxide passes through the first heat transfer zone and transfers heat or thermal energy to the feed gas stream.

The gas stream having the reduced concentration of nitrous oxide passes to a third heat transfer zone 18 to produce a cooled gas stream. The cooled gas stream is yielded and passes to the downstream from the third heat transfer zone 18 by way of conduit 30.

The cooled gas stream will have a concentration of nitrous oxide that is significantly lower than the contaminating concentration of nitrous oxide of the gas stream being introduced into heat transfer zone 12 by way of conduit 20.

In one embodiment, the reaction zone also contains a selective catalytic reduction (SCR) catalyst for the removal of $NH_3$ and $NO_x$. $NH_3$ is already present in the stream and does not need to be added as a reagent as in typical SCR reaction systems.

In another embodiment, the reaction zone also contains catalyst suitable for the reduction of $NO_x$, $NH_3$, $SO_x$, VOC, CO, dioxin, etc.

What is claimed is:

1. A process for the removal of nitrous oxide ($N_2O$) from a feed gas stream containing a contaminating concentration of nitrous oxide, wherein said process comprises:
   (a) passing the feed gas stream through a first heat transfer zone that is in heat exchange relationship with a product stream whereby heat is transferred from the product stream to the feed gas stream to thereby provide a heated gas stream;
   (b) passing said heated gas stream to a reaction zone containing a $N_2O$ decomposition catalyst that provides for the decomposition of nitrous oxide and yielding therefrom a product stream having a reduced concentration of nitrous oxide;
   (c) passing the product stream to the first heat transfer zone to provide a cooled product stream; and
   (d) passing the cooled product stream to an additional treatment process to remove additional greenhouse gas components before it is passed to the atmosphere.

2. A process as recited in claim 1, further comprising passing the heated gas stream from step (a) to a second heat transfer zone whereby the heated gas stream is further heated.

3. A process as claimed in claim 2 wherein the second heat transfer zone comprises an electrical heater, a gas burner, a steam heater or a catalytic converter.

4. A process as recited in claim 1 further comprising passing the cooled product stream to a third heat transfer zone to recover additional heat from the cooled product stream.

5. A process as claimed in claim 4 wherein the third heat transfer zone heats water or steam to produce or heat steam.

6. A process as recited in claim 1 wherein said contaminating concentration of nitrous oxide is in the range of from about 100 ppmv to about 600,000 ppmv, and wherein the nitrous oxide destruction removal efficiency ($D_{eff}$) for said process is greater than 75%.

7. A process as recited in claim 1 wherein said $N_2O$ decomposition catalyst comprises a zeolite loaded with a noble metal selected from the group consisting of ruthenium, rhodium, silver, rhenium, osmium, iridium, platinum and gold, and loaded with a transition metal selected from the group consisting of vanadium, chromium, manganese, iron, cobalt, nickel and copper.

8. A process as claimed in claim 1 wherein the reaction zone comprises additional catalysts.

9. A process as claimed in claim 1 further comprising contacting the gas stream with a catalyst to reduce the level of NOx, CO, VOC or dioxin in the gas stream.

10. A process for the removal of nitrous oxide ($N_2O$) from a feed gas stream containing a contaminating concentration of nitrous oxide, wherein said process comprises:
    (a) passing the feed gas stream through a first heat transfer zone that is in heat exchange relationship with a product stream whereby heat is transferred from the product stream to the feed gas stream to thereby provide a heated gas stream;
    (b) passing said heated gas stream to a reaction zone containing a $N_2O$ decomposition catalyst that provides for the decomposition of nitrous oxide and yielding therefrom a product stream having a reduced concentration of nitrous oxide; and
    (c) passing the product stream to the first heat transfer zone to provide a cooled product stream, wherein the gas stream is contacted with a catalyst to reduce the level of NOx, CO, VOC or dioxin in the gas stream.

11. A process as recited in claim 10, further comprising passing the heated gas stream from step (a) to a second heat transfer zone whereby the heated gas stream is further heated.

12. A new process as claimed in 11 wherein the second heat transfer zone comprises an electrical heater, a gas burner, a steam heater or a catalytic converter.

13. A process as recited in claim 10 further comprising passing the cooled product stream to a third heat transfer zone to recover additional heat from the cooled product stream.

14. A process as claimed in claim 13 wherein the third heat transfer zone heats water or steam to produce or heat steam.

15. A process as recited in claim 10, further comprising passing the cooled product stream to an additional treatment process to remove additional greenhouse gas components before it is passed to the atmosphere.

16. A process as recited in claim 10 wherein said contaminating concentration of nitrous oxide is in the range of from about 100 ppmv to about 600,000 ppmv, and wherein the nitrous oxide destruction removal efficiency ($D_{eff}$) for said process is greater than 75%.

17. A process as recited in claim 10 wherein said $N_2O$ decomposition catalyst comprises a zeolite loaded with a noble metal selected from the group consisting of ruthenium, rhodium, silver, rhenium, osmium, iridium, platinum and gold, and loaded with a transition metal selected from the group consisting of vanadium, chromium, manganese, iron, cobalt, nickel and copper.

* * * * *